(12) United States Patent
Dancey

(10) Patent No.: US 6,889,910 B2
(45) Date of Patent: May 10, 2005

(54) COMBUSTION ENVIRONMENT CONTROL SYSTEM

(75) Inventor: Larry Dancey, Melfort (CA)

(73) Assignee: Dry Air 2000 Inc., St. Brieux (CA)

(*) Notice: Subject to any disclaimer, the term of this patent is extended or adjusted under 35 U.S.C. 154(b) by 31 days.

(21) Appl. No.: 10/614,747

(22) Filed: Jul. 7, 2003

(65) Prior Publication Data

US 2005/0006490 A1 Jan. 13, 2005

(51) Int. Cl.$^7$ .............................................. G05D 23/00
(52) U.S. Cl. ...................................... 237/2 A; 237/8 A
(58) Field of Search ......................... 237/2 A, 69, 70, 237/16; 236/49.1

(56) References Cited

U.S. PATENT DOCUMENTS

| | | | |
|---|---|---|---|
| 3,047,054 A | * | 7/1962 | Hunter et al. ............... 431/209 |
| 4,015,932 A | | 4/1977 | Zurawski |
| 4,173,189 A | | 11/1979 | Cooper |
| 4,287,857 A | | 9/1981 | Schnitzer |
| 4,369,029 A | | 1/1983 | Förster et al. |
| 4,390,007 A | | 6/1983 | Paquette |
| 4,664,096 A | | 5/1987 | Narang |
| 4,719,877 A | | 1/1988 | Delage |
| 4,751,913 A | | 6/1988 | Vetter |
| 5,109,807 A | | 5/1992 | Sarkisian et al. |
| 5,218,944 A | | 6/1993 | Leonard |
| 5,221,043 A | | 6/1993 | Hardy |
| 5,472,341 A | * | 12/1995 | Meeks ......................... 431/243 |
| 6,290,487 B1 | * | 9/2001 | Velke ........................... 431/11 |

FOREIGN PATENT DOCUMENTS

| | | |
|---|---|---|
| CA | 1143647 | 3/1983 |
| CA | 2233053 | 3/1998 |

* cited by examiner

*Primary Examiner*—Derek S. Boles
(74) *Attorney, Agent, or Firm*—Porter, Wright, Morris & Arthur, LLP

(57) ABSTRACT

The present invention provides a system enabling the control of a combustion environment thereby adjusting the affect of ambient temperatures on the combustion quality on all modes of operation. The system can be described as a system for controlling a combustion environment within a combustion chamber of a hydronic heating system comprising a boiler containing a heat transfer fluid (HTF), a burner within a combustion chamber, and a fluidic distribution network in fluidic contact with the boiler thereby enabling movement of HTF. The temperature control system comprises of a first heating unit for adjusting the temperature of the fuel fed to the burner, a second heating unit for adjusting combustion air temperature and a third heating unit associated with the boiler to heat the HTF in the boiler to operating temperature.

28 Claims, 2 Drawing Sheets

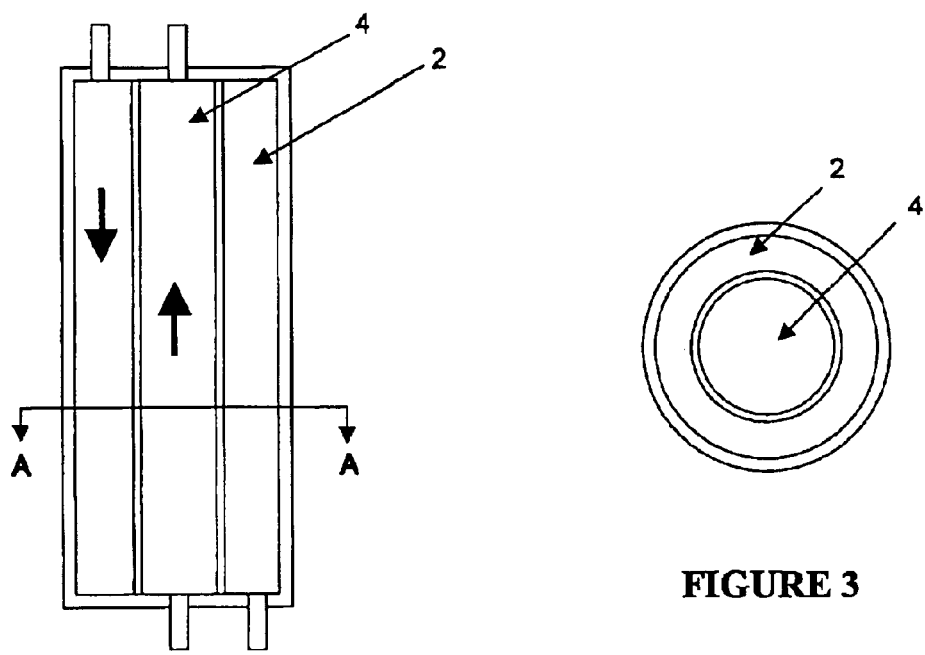
FIGURE 2
FIGURE 3
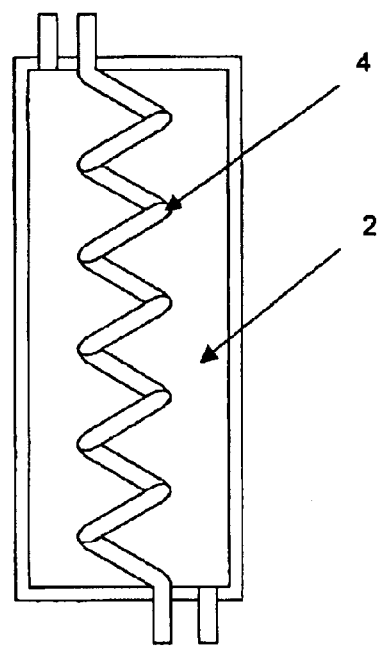
FIGURE 4

COMBUSTION ENVIRONMENT CONTROL SYSTEM

FIELD OF THE INVENTION

The present invention pertains to the field of combustion and in particular to a system enabling the control of a combustion environment thereby adjusting the affect of ambient temperatures on combustion quality.

BACKGROUND

As is known to a worker skilled in the art, combustion is a rapid chemical reaction combining fuel components with air resulting in reaction by-products together with heat and light. In order for a proper reaction to occur the fuel to air ratio should be within a predetermined level and this level is directly dependent on the type of fuel being combusted. For example, when this ratio is defined in terms of the mass of air to the mass of fuel, the amount of air required for the combustion of natural gas is greater than that required for coal.

Central heating systems employing a hot fluid circulating through a network of pipes have been used for many years for room space heating, snow melting, indirect swimming pool heating, ground heating and other similar purposes. Such systems are now generically referred to as hydronic heating systems.

One of the biggest problems with hydronic heating systems is combustion efficiency. In environments where temperatures change significantly, the fuel to air ratio can deviate significantly from an optimum predetermined ratio. Poor combustion efficiency can result in greater fuel usage and incomplete combustion, wherein incomplete combustion can produce soot. The potential build-up of soot can become a problem for boiler systems, particularly those that are oil fired. Soot that accumulates on the walls of the heat transfer surfaces significantly reduces the efficiency of the boiler since it can impede heat transfer. For this reason the conventionally known oil fired boilers require frequent cleaning in order to maintain peak operating efficiency.

One of the most effective ways to achieve improved combustion efficiency is to preheat the combustion reactants used by the burner. It is well known that preheating fuel improves the efficiency and cleanliness of the burning process. It has been found that by preheating the fuel before it is burned, the viscosity and other properties of the fuel are affected so that the burner utilises less fuel to provide the same amount of heat energy.

Fuel preheaters of the prior art often have an external power source such as electricity to power an electric heater to heat the fuel before it is passed to the burner nozzle. Other prior art systems pass the fuel in pipes through tanks which contain heated water directed from the boiler to increase the temperature of the fuel before it enters the fuel burner for combustion. U.S. Pat. Nos. 5,109,807, 4,390,007, 4,719,877, 5,221,043 describe the various fuel preheaters.

It is also known that preheating of combustion air going to the burner is another way to improve efficiency and productivity. Similar to preheating fuel, the preheating of combustion air can result in more heat from a given amount of fuel.

In general, combustion air preheaters for fuel burners and like systems utilise combustion exhaust gas heat to preheat combustion air before being introduced to the burner. U.S. Pat. Nos. 4,664,096, 4,751,913, 4,369,029, 4,015,932 and Canadian Patent No. 2,233,053 describe various combustion air preheaters using exhaust gas. While these examples provide a means for preheating combustion air, they do not provide a means for preheating combustion air during cold starts. During cold start operations, hot combustion gases are not yet available and thus preheating of combustion air therewith is not possible.

Further combustion air preheating systems are known, with various improvements, such as that disclosed in U.S. Pat. No. 4,369,029. The system disclosed therein describes a ceramic recuperator for the heating of combustion air. The recuperator is provided with means, especially electrically operated, for heating the ceramic body so that initial combustion air can be heated before firing of the burner and further heating of the recuperator by combustion products. In light of the foregoing, there is a need for a system enabling the control of the combustion environment thereby adjusting the affect of ambient temperatures on the combustion quality in all modes of operation.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a combustion environment control system. In accordance with an aspect of the present invention, there is provided a system for controlling a combustion environment within a combustion chamber of a hydronic heating unit, said hydronic heating unit including a boiler containing a heat transfer fluid (HTF), a heating element disposed within the combustion chamber associated with the boiler and a fluid distribution network in fluidic contact with the boiler thereby enabling movement of the HTF, said system comprising: a first heating unit for adjusting fuel temperature, wherein fuel being transferred from a fuel source to the heating element has a predetermined temperature upon arrival at the heating element, said first heating unit including a first chamber and second chamber in thermal conductive contact, whereby regulating the HTF through the second chamber enables regulation of the fuel temperature of the fuel passing through the first chamber; a second heating unit for adjusting combustion air temperature, wherein combustion air transferred to the heating element has a predetermined temperature upon arrival at the heating element, said second heating unit having a first portion and a second portion in thermal conductive contact, whereby regulating the HTF through the second portion enables regulation of the combustion air temperature of the combustion air passing through the first portion; and a third heating unit interconnected with the boiler for heating the HTF to an operational temperature, such that the operational temperature of the HTF is sufficient to adjust fuel temperature and combustion air temperature to predetermined levels prior to ignition of the heating element.

In another object of the present invention there is provide A method for controlling a combustion environment within a combustion chamber of a hydronic heating unit, said hydronic heating unit including a boiler containing a HTF, a heating element disposed within the combustion chamber associated with the boiler, a fluid distribution network in fluidic contact with the boiler thereby enabling movement of the HTF, a fuel preheater disposed within the fluid distribution network, a combustion air preheater disposed within the fluid heating network, and a cold start preheater associated with the boiler, said method comprising: detecting the temperature of the HTF within the boiler; adjusting the temperature of the HTF within the boiler to a predetermined operating temperature; detecting the temperature of fuel and combustion air entering the combustion chamber; adjusting the temperature of fuel and combustion air entering the combustion chamber to a predetermined operating temperature; and repeating the steps of detecting the temperature of fuel and combustion air entering the combustion chamber and adjusting the temperature of fuel and combustion air entering the combustion chamber to maintain the predetermined operating temperature.

BRIEF DESCRIPTION OF THE FIGURES

FIG. 2 is a schematic of a first heating unit according to one embodiment of the present invention.

FIG. 3 is a cross section of the first heating unit of FIG. 2 taken at Section A—A.

FIG. 4 is a schematic of a first heating unit according to another embodiment of the present invention.

DETAILED DESCRIPTION OF THE INVENTION

Definitions

Figure 1:
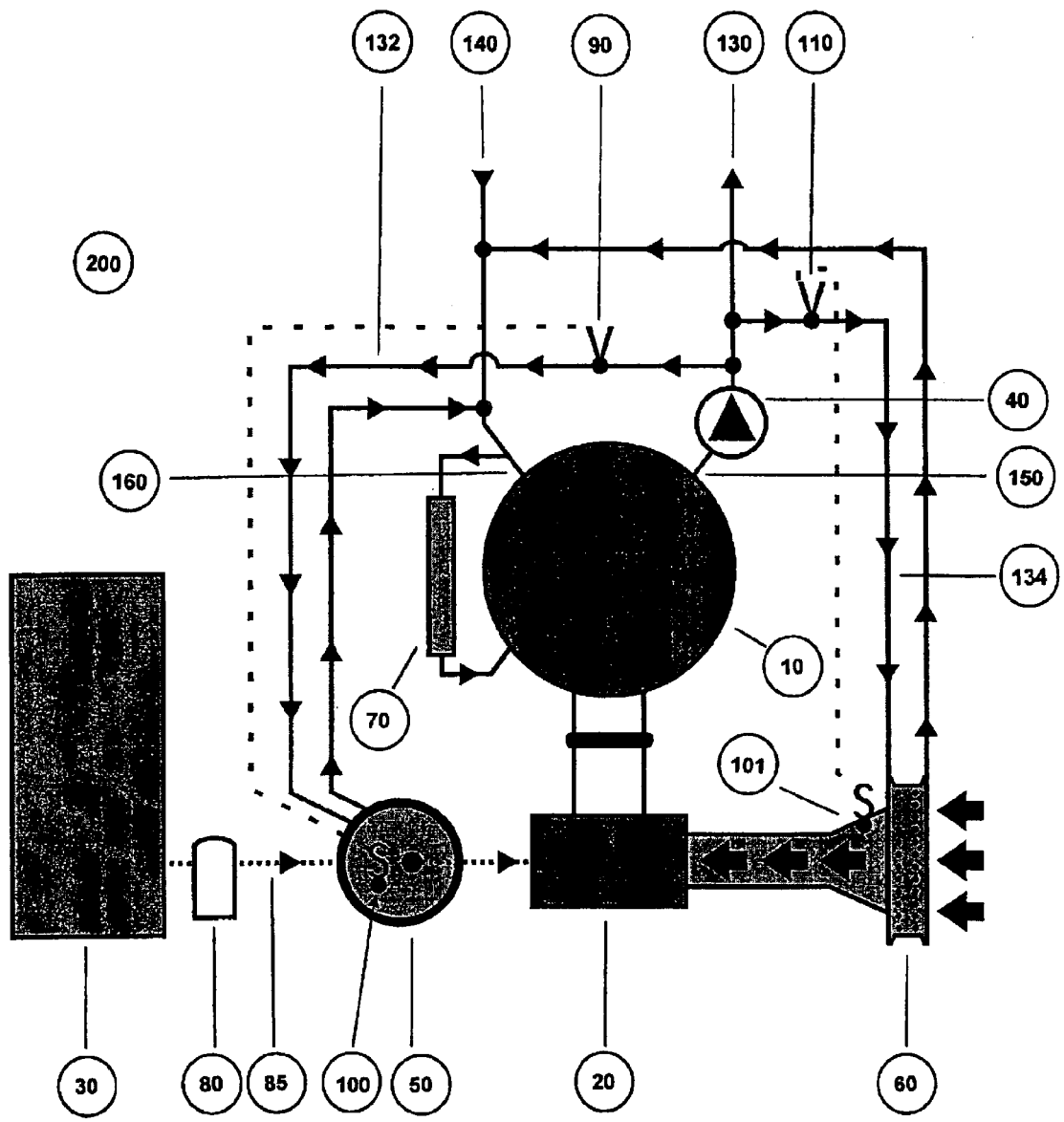
FIG. 1 is a schematic of the combustion environment control system according to one embodiment of the present invention.

The term "heat transfer fluid" ("HTF") means any fluid used to carry heat to operate various fans, coils, or other thermal radiant devices and includes water, any mixture of water & anti-freeze, air, or any other fluid that is safe for use as a HTF for hydronic heating systems.

The term "operating temperature" refers to the peak temperature of the HTF in the boiler when the system is running normally and not on a cold start.

The term "cold start" refers to starting conditions where the system has been shut down and where the HTF in the boiler is below operating temperature.

The term "optimum fuel temperature" refers to the temperature of the fuel entering the combustion chamber that would provide the most efficient combustion when it is burned therein.

The term "optimum combustion air temperature" refers to the temperature of the air entering the combustion chamber that would provide the most efficient combustion.

The term "fuel" means any light oils such as #1 or #2 heating oil, summer, winter or blended diesel fuel, kerosene and jet fuels of equivalent weight, and like fuels.

Unless defined otherwise, all technical and scientific terms used herein have the same meaning as commonly understood by one of ordinary skill in the art to which this invention belongs.

The invention provides a system enabling the control of a combustion environment thereby adjusting the affect of ambient temperatures on the combustion quality on all modes of operation. The system can be described as a system for controlling a combustion environment within a combustion chamber of a hydronic heating system comprising a boiler containing a HTF, a burner within a combustion chamber, and a fluidic distribution network in fluidic contact with the boiler thereby enabling movement of HTF. The temperature control system comprises a first heating unit for adjusting the temperature of the fuel fed to the burner, a second heating unit for adjusting combustion air temperature and a third heating unit associated with the boiler to heat the HTF in the boiler to operating temperature in a cold start scenario, wherein the HTF is below the operating temperature.

By heating both fuel and combustion air in one system, substantial fuel savings may be effected and can reduce maintenance costs. Further benefits may be achieved, by having a means to preheat both fuel and combustion air during cold start situations.

FIG. 1 illustrates a schematic view of the combustion environment control system 200 according to one embodiment of the present invention. The combustion environment control system 200 includes a first heating unit 50, a second heating unit 60, a third heating unit 70, and a boiler 10 containing a HTF.

The HTF is heated in the boiler's 10 supply manifold using a burner 20 which is housed within a combustion chamber (not shown). The boiler 10 includes a boiler supply manifold and a return manifold. The boiler 10 supplies the HTF supply line 130 with hot HTF from its main supply manifold. The hot HTF exits the boiler 10 at a boiler outlet 150 and a system pump 40 pressurises the system and circulates the hot HTF through the HTF supply line 130. After circulating throughout the HTF supply line 130, the cooled HTF returns via the boiler return line 140 to the boiler's 10 return manifold through the boiler inlet 160 where it is reheated to operating temperature.

First Heating Unit

The first heating unit 50 is used to adjust the temperature of the fuel that is supplied to the burner 20. The first heating unit 50 is thermally coupled to the fuel preheat line 132. The fuel preheat line 132 is branched off of the HTF supply line 130 thereby supplying hot HTF to the first heating unit 50. A flow control valve 90 is incorporated in the fuel preheat line 132 between the first heating unit 50 and the HTF supply line 130 enabling control of the flow of HTF to the first heating unit 50 based on feedback from a thermostatic fuel temperature sensor 100. Fuel is supplied to the first heating unit 50 from the fuel tank 30 using a fuel pump (not shown) which is integrally associated with the burner. A fuel filter 80 is incorporated in the fuel supply line 85 on the inlet side of the first heating unit 50. The fuel temperature sensor 100 is immersed in the fuel reservoir within the first heating unit 50. The fuel temperature sensor 100 measures the temperature of the heated fuel and is associated with the flow control valve 90. Based on feedback from the fuel temperature sensor 100, the flow control valve 90 regulates the flow of the hot HTF such that the temperature of the heated fuel exiting the first heating unit 50 and entering the burner 20 is within a range of about ±0.5° C. or ±3° C. of the optimum fuel temperature, or any range there between.

In another embodiment of the invention, the fuel pump is incorporated within the fuel supply line 85 outside of the burner assembly.

Disposed within the first heating unit 50 are fluid-to-fuel heat transfer means. Said fluid-to-fuel heat transfer means comprises of a first chamber and a second chamber in thermal conductive contact, whereby regulating the hot HTF through the second chamber enables regulation of the fuel temperature of the fuel passing through the first chamber.

In one embodiment the fluid-to-fuel heat transfer means is a fuel heater assembly comprising an interior, cylindrical, fuel reservoir about 4" in diameter and 24" long (approximately 1.3 U.S. gallons) with an inlet at one longitudinal end to receive filtered fuel from the fuel tank 30 and an outlet at the opposite longitudinal end to supply heated fuel to the burner 20. An exterior HTF reservoir comprising a jacket about ½ thick encompassing the fuel reservoir with an inlet at one longitudinal end to receive hot HTF from the fuel preheat line 132 and an outlet at the opposite end connected to the boiler return line 140. The fuel temperature sensor 100 is immersed in the fuel reservoir at the outlet end of the fuel reservoir. With the fuel heater assembly mounted vertically, fuel enters through the fuel reservoir inlet from the bottom of the fuel heater assembly and exits from the fuel reservoir outlet at the top. HTF enters through the HTF jacket inlet at the top of the fuel heater assembly and exits through HTF jacket outlet at the bottom, creating a counter-flow heat transfer situation. This embodiment of the first heating unit is illustrated in FIGS. 2 and 3.

In another embodiment and with reference to FIG. 4, the fuel heater assembly comprises of a helical pipe as a fuel reservoir that is interconnected to the fuel supply line 85 such that the first end receives fuel from the fuel tank 30 and the second end supplies heated fuel to the burner 20. The helical pipe is enclosed within a cylindrical reservoir of HTF interconnected to the fuel preheat line 132 with an inlet at one end to receive hot HTF and outlet at the other to expel cooled HTF to the boiler return line 140. A fuel temperature sensor 100 is immersed in the fuel reservoir at the second end of the helical pipe. With the fuel heater assembly mounted vertically, fuel enters the inlet of the helical pipe at bottom of the fuel heater assembly and exits through the second end at the top. HTF enters through the cylindrical reservoir of HTF inlet at the top of the fuel heater assembly and exits through the outlet at the bottom, creating a counter-flow heat transfer situation.

In another embodiment, the fuel heater assembly comprises of a helical pipe interconnected to the fuel preheat line 132 such that the first end receives hot HTF and the second end returns cooled HTF to the boiler 10. The helical pipe is enclosed within a cylindrical reservoir of fuel interconnected to the fuel supply line 85 with an inlet at a first end to receive fuel from the fuel tank 30 and a second end to supply heated fuel to the burner 20. The temperature sensor 100 is immersed in the cylindrical reservoir of fuel at the second end of the fuel reservoir. With the fuel heater assembly mounted vertically, fuel enters the first end of the cylindrical reservoir at bottom of the fuel heater assembly and exits through the second end at the top. HTF enters the helical pipe at the top of the fuel heater assembly and exits through the outlet at the bottom, creating a counter-flow heat transfer situation.

In another embodiment, the fuel heater assembly comprises a fuel inlet that is proximate to the HTF inlet and a fuel outlet proximate to the HTF outlet thereby creating a concurrent flow heat transfer situation.

In another embodiment, the fuel temperature sensor 100 is integrally associated with the burner's fuel intake.

In one embodiment of the invention, the flow control valve 90 is electronically controlled by an internal or integrated control system in the form of a microprocessor for example, which provides a means for regulating the flow of the HTF to the first heating unit based on information received from the fuel temperature sensor 100. This internal control system, can manipulate the flow control valve between a plurality of flow regulation levels, thereby enabling the minor adjustment in the flow rate of HTF to the first heating unit. Optionally, the flow control valve can be operated an external control system and in one embodiment a single control system is used to control the valves associated with both the first and second heating units.

Second Heating Unit

The second heating unit 60 is used to adjust the temperature of air that is supplied to the burner 20. The second heating unit 60 is thermally coupled to the combustion air preheat line 134. The combustion air preheat line 134 is branched off of the HTF supply line 130 and supplies hot HTF to the second heating unit 60. A flow control valve 110 is incorporated in the combustion air preheat line 134 to control the flow of HTF to the second heating unit 60. Ambient air is supplied to the second heating unit 60 by an air movement device (not shown) juxtaposed to the second heating unit 60. A thermostatic air temperature sensor 101 is located within the second heating unit 60 downstream from the ambient air source. Based on feedback from the air temperature sensor 101, the flow control valve 110 regulates the flow of the hot HTF such that the temperature of the heated air exiting the second heating unit 60 and entering the combustion chamber is within a range of about ±0.5° C. or ±3° C. of the optimum combustion air temperature, or any range there between.

Disposed within the second heating unit 60 is an air-to-fluid heat transfer means. Said air-to-fluid heat transfer means generally comprises of a first portion and a second portion in thermal conductive contact, whereby regulating the HTF through the second portion enables the regulation of the temperature of the combustion air passing through the first portion.

In one embodiment the air-to-fluid heat transfer means is a combustion air heater assembly comprising a fluid-to-air heat exchange coil or a radiator-like system placed within the air flow in a duct system that, for example, routes ambient air to the burner's combustion air inlet. Hot HTF is supplied from the combustion air preheat line 134 to the fluid-to-air heat exchange coil regulating the temperature of the air flow and then returned to the boiler return line 140. An air movement device (not shown), which is integrally associated with the burner 20, draws ambient air which is then forced through the duct system and passed over the air-to-fluid heat exchange coil thereby heating the air. The air temperature sensor 101 is located at one end of the duct system opposite the ambient air source.

In another embodiment the air movement device (not shown) is located within the duct system external to the burner assembly.

In another embodiment the combustion air heater assembly comprises of fluid-to-air heat exchange coil disposed within the combustion chamber with the burner 20, and an ambient air inlet associated with the fluid-to-air heat exchange coil. As air is burned off within the combustion chamber, ambient air is drawn into the chamber through the air inlet and passed through the fluid-to-air heat exchange coil. An air temperature sensor 101 is located downstream of the air flow from the fluid-air-heat exchange coil. Based on feedback from the air temperature sensor 101, the flow control valve 110 regulates the flow of the hot HTF such that the temperature of the heated air entering the combustion chamber is within a range of about ±0.5° C. or ±3° C. of the optimum combustion air temperature, or any range there between.

In one embodiment of the invention, the flow control valve 110 is electronically controlled by an internal or integrated control system internal thereto in the form of a microprocessor for example, which provides a means for regulating the flow of the HTF to the second heating unit based on information received from the air temperature sensor 101. This internal control system, can manipulate the flow control valve between a plurality of flow regulation levels, thereby enabling the minor adjustment in the flow rate of HTF to the second heating unit. Optionally, the flow control valve can be operated an external control system.

Third Heating Unit

The third heating unit 70 is used to adjust the temperature of the HTF on cold starts of the hydronic heating system. The heating means of the third heating unit 70 is an electric heater in the form of a resistor, for example, or any other electrical heating device as would be known to a worker skilled in the art. The third heating unit is vertically disposed and is coupled to the boiler 10. A thermostatic HTF temperature sensor (not shown) is associated with the HTF reservoir of the boiler 10 and is used to regulate the operation of the electric heating means such that power to the third heating unit 70 is interrupted when the HTF within the boiler reaches operating temperature. Power to the electric heating means is electrically interlocked with the system pump 40 such that the system pump 40 can not be energised if the electric heating means is activated. An HTF fluid level sensor (not shown) is located within the boiler 10 and is used to interrupt power to the third heating unit 70 when the system is low on HTF.

Disposed within the third heating unit 70 is electric heating means in thermal-conductive contact with an HTF reservoir. An example of electric heating means is an electric heater in the form of a resistor.

In one embodiment, the third heating unit comprises a vertically disposed, thermal conductive container with an interior HTF reservoir with a top and bottom end. The bottom end of the third heating unit 70 is coupled to a port near the bottom of the boiler's water jacket and the top end of the third heating unit 70 is couple to a port near the top of the boiler's water jacket. A resistor-based electric heating element is affixed to the exterior of the HTF reservoir. HTF enters the bottom end of the third heating unit 70 and is heated through the interior reservoir wall by the electric heater as it circulates therein. Through convective circulation, the hot HTF exits the third heating unit 70 at the top end and is fed back into the boiler's supply reservoir.

In another embodiment of the invention, the third heating unit 70 comprises of a resistor-based heating element affixed to the exterior housing of the boiler 10. The HTF in the boiler is heated to operating temperature directly through the boiler's housing.

In another embodiment of the invention, the third heating unit 70 comprises of one or more resistor-based heating elements inserted into the boiler's HTF reservoir in direct contact with the HTF.

Sequence of Events during Normal Operation

Hot HTF exiting the boiler into the HTF supply line 130 is branched into the fuel preheat line 132 and combustion air preheat line 134 whereupon it enters the first heating unit 50 and second heating unit 60, respectively.

The hot HTF in the first heating unit 50 heats the fuel contained therein. When the temperature of the fuel exiting the first heating unit 50 and into the combustion chamber deviates within a range of ±0.5° C. or ±3° C. of the optimum fuel temperature or any range there between, the fuel temperature sensor associated with the first heating unit 50 communicates with the flow control valve 90 incorporated in the fuel preheat line 132 to adjust the flow of hot HTF to the first heating unit 50 sufficiently to restore the temperature of the fuel exiting the first heating unit 50 to optimum fuel temperature. The heated fuel is then supplied to the burner 20 located within the combustion chamber.

Similar to the first heating unit 50, hot HTF in the second heating unit 60 heats the ambient air that is supplied by the air movement device (not shown). When the temperature of the air exiting the second heating unit 60 and entering the combustion chamber deviates within a range of ±0.5° C. or ±3° C. of the optimum combustion air temperature or any range there between, the air temperature sensor 101 associated with the second heating unit 60 communicates with the flow control valve 110 incorporated in the combustion air preheat line 134 to adjust the flow of hot HTF to the second heating unit 60 sufficiently to restore the temperature of the air exiting the second heating unit 60 to optimum combustion air temperature. The heated air is then supplied to the burner within the combustion chamber.

The hot HTF circulating through the first heating unit 50 and the second heating unit 60 is looped back to the boiler 10 where it is reheated to operating temperature.

Sequence of Events on Cold Starts

On cold starts, the electric heating means of the third preheat unit 70 is engaged and the system pump 40 is disengaged.

In one embodiment of the invention, cold HTF is supplied into the third heating unit 70 from the boiler 10 where it is heated therein and is returned to the boiler 10. When the temperature of the HTF in the boiler 10 reaches operating temperature, the electric heating means is disengaged and the system pump 40 is activated. The system then operates in normal operation.

In another embodiment of the invention, the HTF in the boiler 10 is heated directly through the boiler housing by electric means. When the temperature of the HTF in the boiler 10 reaches operating temperature, the electric heating means is disengaged and the system pump 40 is activated. The system then operates in Normal Operation.

Proposed Uses

The invention is designed to be portable and customisable depending upon its intended application. The size and shape of each heating unit will vary depending on the environment to which it is used and its intended use. For example, applications in extreme cold conditions may require larger heating units with helical pipes to increase the surface area for the pre-heating of fuel and air; temporary applications in moderate climates may require smaller heating units to maximize portability such as in construction sites.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A system for controlling a combustion environment within a combustion chamber of a hydronic heating unit, said hydronic heating unit including a boiler containing a HTF, a heating element disposed within the combustion chamber associated with the boiler means and a fluid distribution network in fluidic contact with the boiler thereby enabling movement of the HTF, said system comprising:

a first heating unit for adjusting fuel temperature, wherein fuel being transferred from a fuel source to the heating element has a predetermined temperature upon arrival at the heating element, said first heating unit including a first chamber and second chamber in thermal conductive contact, whereby regulating the HTF through the second chamber enables regulation of the fuel temperature of the fuel passing through the first chamber;

a second heating unit for adjusting combustion air temperature, wherein combustion air transferred to the heating element has a predetermined temperature upon arrival at the heating element, said second heating unit having a first portion and a second portion in thermal conductive contact, whereby regulating the HTF through the second portion enables regulation of the combustion air temperature of the combustion air passing through the first portion; and a third heating unit interconnected with the boiler for heating the HTF to an operational temperature, such that the operational temperature of the HTF is sufficient to adjust fuel temperature and combustion air temperature to predetermined levels prior to ignition of the heating element.

2. The system in accordance with claim 1, where the flow of HTF to said first heating unit is regulated by a valve located within a fluid conduit system, said fluid conduit system providing a fluidic connection between the fluidic distribution network, the first heating unit and the boiler, thereby providing a source of heated HTF to the first heating unit and a means of recycling cooled HTF from the first heating unit to the boiler.

3. The system in accordance with claim 1, where the flow of HTF to said second heating unit is regulated by a second valve located within a second fluid conduit system, said second fluid conduit system providing fluidic connection between the fluidic distribution network, the second heating unit and the boiler, thereby providing a source of heated HTF to the second heating unit and a means of recycling cooled HTF from the second heating unit to the boiler.

4. The system in accordance with claim 1, where the HTF within said third heating unit is heated using an electric heating device.

5. The system in accordance to claim 2, where said valve is adjusted using a control system, said control system receives temperature input from a thermostatic sensing device located within the first chamber of the first heating unit.

6. The system in accordance to claim 3, where said valve is adjusted using a second control system, said second control system receives temperature input from a second thermostatic sensing device located within the first portion of the second heating unit.

7. The system in accordance to claim 4, where said electric heating device is regulated using a third thermostatic sensing device located within the HTF reservoir of the boiler.

8. The system in accordance with claim 2 where said second chamber is a tubular shell with a first end and a second end, said tubular shell having an HTF inlet at the first end and an HTF outlet at the second end, said first chamber is a cylindrical container extending through the tubular shell having a fuel inlet proximate to the HTF outlet and a fuel outlet proximate to the HTF inlet thereby providing counter-flow heat transfer characteristics, said conduit system comprises of a pipe interconnecting the fluid distribution network, at a location proximate to the boiler, to the HTF inlet of the first heating unit and a second pipe interconnecting the first heating unit to the boiler, whereby fuel entering through the fuel inlet is heated as it flows through the cylindrical container before exiting through the fuel outlet for discharge into the combustion chamber.

9. The system in accordance with claim 2 where said second chamber is a tubular shell with a first end and a second end, said tubular shell having an HTF inlet at the first end and an HTF outlet at the second end, said first chamber is a helical pipe extending through the tubular shell having a fuel inlet proximate to the HTF outlet and a fuel outlet proximate to the HTF inlet thereby providing counter-flow heat transfer characteristics, said conduit system comprises of a pipe interconnecting the fluid distribution network, at a location proximate to the boiler, to the HTF inlet of the first heating unit and a second pipe interconnecting the first heating unit to the boiler, whereby fuel entering through the fuel inlet is heated as it flows through the helical pipe before exiting through the fuel outlet for discharge into the combustion chamber.

10. The system in accordance with claim 2 where said second chamber is a helical pipe with a first end and a second end, said helical pipe having an HTF inlet at the first end and an HTF outlet at the second end, said first chamber is a tubular shell enclosing said helical pipe having a fuel inlet proximate to the HTF outlet and a fuel outlet proximate to the HTF inlet thereby providing counter-flow heat transfer characteristics, said conduit system comprises of a pipe interconnecting the fluid distribution network, at a location proximate to the boiler, to the HTF inlet of the first heating unit and a second pipe interconnecting the first heating unit to the boiler, whereby fuel entering through the fuel inlet is heated as it flows through the tubular shell before exiting through the fuel outlet for discharge into the combustion chamber.

11. The system in accordance with claim 3 where said first portion is a duct housing with an air inlet and an air outlet, said second portion is an HTF fluid-to-air heat radiator located within the housing, said second conduit system comprises of a third pipe interconnecting the fluid distribution network, at a location proximate to the boiler, to the HTF inlet of the second heating unit and a forth pipe interconnecting the second heating unit to the boiler whereby flow of air over the HTF fluid-to-air heat radiator is heated for discharge into the combustion chamber through the air outlet.

12. The system in accordance with claim 3 where said first portion is integrally associated with the combustion chamber, said combustion chamber having an air inlet, said second portion is an HTF fluid-to-air heat radiator located at said air inlet, said second conduit system comprises of a third pipe interconnecting the fluid distribution network, at a location proximate to the boiler, to the HTF inlet of the second heating unit and a forth pipe interconnecting the second heating unit to the boiler whereby flow of air over the HTF fluid-to-air heat radiator is heated as it enters the combustion chamber.

13. The system in accordance with claim 4 where said third heating unit includes a vertically disposed thermally conductive tubular chamber with a top and bottom, an HTF inlet at the bottom providing a first connection to the boiler, an HTF outlet at the top providing a second connection to the boiler and an electric heating device in the form of a resistor integrally associated with the exterior of the chamber, said boiler having a top portion and a bottom portion, said top portion having a HTF inlet interconnected to the HTF outlet of the third heating unit, said bottom portion having an HTF outlet interconnected to the HTF inlet of the third heating unit, whereby HTF moves from the bottom inlet of the third heating unit to the top outlet of the third heating unit by convection currents as it is heated therein.

14. The system in accordance with claim 4 where said third heating unit includes an electric heating device in the form of a resistor integrally associated with the exterior of the boiler.

15. The system in accordance with claim 1 where said heating element is an atomizing-type oil burner, said HTF is circulated through said fluid distribution network using a fluid pump means, and said fuel source is a fuel tank.

16. The system in accordance with claim 15 where electrical power to said fluid pump means is interrupted when the third heating unit is activated.

17. The system in accordance to claim 5 where said thermostatic sensing device is sensitive to approximately 0.5° C. changes in temperature.

18. The system in accordance to claim 6 where said second thermostatic sensing device is sensitive to approximately 0.5° C. changes in temperature.

19. The system in accordance to claim 7 where said third thermostatic sensing device is sensitive to approximately 0.5° C. changes in temperature.

20. The system in accordance to claim 1, where said fuel arriving at the heating element is within a range of about ±0.5° C. of the optimum fuel temperature and said combustion air arriving at the heating element is within a range of about ±0.5° C. of the optimum combustion air temperature.

21. The system in accordance to claim 1, where said fuel arriving at the heating element is within a range of about ±3° C. of the optimum fuel temperature and said combustion air arriving at the heating element is within a range of about ±3° C. of the optimum combustion air temperature.

22. A method for controlling a combustion environment within a combustion chamber of a hydronic heating unit, said hydronic heating unit including a boiler containing a HTF, a heating element disposed within the combustion chamber associated with the boiler, a fluid distribution network in fluidic contact with the boiler thereby enabling movement of the HTF, a fuel preheater disposed within the fluid distribution network, a combustion air preheater disposed within the fluid heating network, and a cold start preheater associated with the boiler, said method comprising:

detecting the temperature of the HTF within the boiler;

adjusting the temperature of the HTF within the boiler to a predetermined operating temperature;

detecting the temperature of fuel and combustion air entering the combustion chamber;

adjusting the temperature of fuel and combustion air entering the combustion chamber to a predetermined operating temperature; and repeating the steps of detecting the temperature of fuel and combustion air entering the combustion chamber and adjusting the temperature of fuel and combustion air entering the combustion chamber to maintain the predetermined operating temperature.

23. The method in accordance to claim 22 where adjusting the temperature of the HTF in the boiler is achieved by preheating the HTF in said cold start preheater and detecting the temperature of the HTF within the boiler is achieved using a thermostatic HTF sensing device.

24. The method in accordance to claim 23 where said cold start preheater receives HTF temperature input from said thermostatic HTF sensing device, said HTF temperature input regulating electrical power to said cold start preheater.

25. The method in accordance to claim 22 where adjusting the temperature of fuel is achieved by preheating the fuel in said fuel preheater and detecting the temperature of fuel is achieved using a thermostatic fuel sensing device.

26. The method in accordance to claim 22 where adjusting the temperature of combustion air is achieved by preheating the combustion air in said combustion air preheater and detecting the temperature of combustion air is achieved using a thermostatic combustion air sensing device.

27. The method in accordance to claim 25 where said fuel preheater is regulated using an HTF flow valve to control the flow of HTF to said fuel preheater, said HTF flow valve receiving fuel temperature input from said thermostatic fuel sensing device, said fuel temperature input modifying the flow of heated HTF to said fuel preheater.

28. The method in accordance to claim 26 where said combustion air preheater is regulated using a second HTF flow valve to control the flow of HTF to said combustion air preheater, said second HTF flow valve receiving combustion air input from said thermostatic combustion air sensing device, said combustion air input modifying the flow of heated HTF to said combustion air preheater.

* * * * *